(12) United States Patent
Stahl

(10) Patent No.: US 10,995,493 B2
(45) Date of Patent: May 4, 2021

(54) PROFILED METAL FIBER

(71) Applicant: HACANOKA GMBH, Vöhringen (DE)

(72) Inventor: Karl-Hermann Stahl, Voehringen (DE)

(73) Assignee: HACANOKA GMBH, Voehringen (DE)

( * ) Notice: Subject to any disclaimer, the term of this patent is extended or adjusted under 35 U.S.C. 154(b) by 0 days.

(21) Appl. No.: 16/347,687

(22) PCT Filed: Nov. 2, 2017

(86) PCT No.: PCT/DE2017/000364
§ 371 (c)(1),
(2) Date: May 6, 2019

(87) PCT Pub. No.: WO2018/091005
PCT Pub. Date: May 24, 2018

(65) Prior Publication Data
US 2019/0257085 A1    Aug. 22, 2019

(30) Foreign Application Priority Data

Nov. 15, 2016 (DE) .................. 10 2016 013 615.4
Jul. 4, 2017 (DE) .................. 10 2017 006 298.6

(51) Int. Cl.
*E04C 5/01* (2006.01)
*B21B 1/16* (2006.01)
(Continued)

(52) U.S. Cl.
CPC ............. *E04C 5/012* (2013.01); *B21B 1/16* (2013.01); *B21F 13/00* (2013.01); *B21H 8/00* (2013.01);
(Continued)

(58) Field of Classification Search
CPC . E04C 5/012; E04C 5/073; E04C 5/03; B21H 8/00; B23D 31/002; B21F 13/00; B21B 1/16
(Continued)

(56) References Cited

U.S. PATENT DOCUMENTS 1,400,278 A * 12/1921 Fougner .................... E04C 5/03
  52/852
5,419,965 A * 5/1995 Hampson ................ B21B 1/095
  106/644

(Continued)

FOREIGN PATENT DOCUMENTS

GB          882701 A  * 11/1961
GB          882701 B    11/1961
JP     20012201930 B    8/2001

*Primary Examiner* — Brian E Glessner
*Assistant Examiner* — Adam G Barlow
(74) *Attorney, Agent, or Firm* — Andrew Wilford

(57) ABSTRACT

The profiled metal fibre with a substantially rectangular cross-section, also with bent fibre ends in the form of a clip, is used to stabilise, bond, attach or join materials and construction materials such as concrete, wood, paper and the like. The fibre edges of the fibre outer surfaces extending in the longitudinal direction of the fibre are designed as edge surfaces (2) oriented at an angle to the fibre outer surfaces in the manner of a bevel. The two wider fibre outer surfaces (3.1, 3.2) of the rectangular fibre are provided with V-shaped channels (4) extending in the longitudinal direction, wherein the edge surfaces (2) are provided with projections (6) and the V-shaped channels (4) are provided with end zones (5) that bound their longitudinal extent. The projections form anchoring heads and the end zones form anchor surfaces with respect to the material to be stabilised, bonded or attached.

9 Claims, 1 Drawing Sheet

(51) Int. Cl.
  E04C 5/03 (2006.01)
  B21H 8/00 (2006.01)
  E04C 5/07 (2006.01)
  B23D 31/00 (2006.01)
  B21F 13/00 (2006.01)

(52) U.S. Cl.
  CPC .............. B23D 31/002 (2013.01); E04C 5/03 (2013.01); E04C 5/073 (2013.01)

(58) Field of Classification Search
  USPC ...... 52/309.17, 649, 851, 852; 428/397, 399, 428/400
  See application file for complete search history.

(56) References Cited

U.S. PATENT DOCUMENTS

| | | | | |
|---|---|---|---|---|
| 5,548,986 A * | 8/1996 | Matsuo | ................ | B21B 1/0815 72/204 |
| 6,045,910 A * | 4/2000 | Lambrechts | ............ | E04C 5/012 428/399 |
| 6,612,085 B2 * | 9/2003 | Edwards | .................. | E04C 5/03 428/397 |
| 8,771,937 B2 | 7/2014 | Stahl | | |
| 2006/0008613 A1 * | 1/2006 | Dewinter | ............ | C04B 20/0048 428/113 |
| 2012/0097073 A1 * | 4/2012 | Lambrechts | ............ | E04C 5/012 106/644 |
| 2012/0131976 A1 | 5/2012 | Stahl | | |
| 2012/0231291 A1 * | 9/2012 | Stahl | ...................... | E04C 5/012 428/600 |
| 2013/0108868 A1 * | 5/2013 | Nutter | ................ | C04B 20/0048 428/400 |
| 2014/0178686 A1 * | 6/2014 | Forgeron | .................. | D01F 8/18 428/399 |
| 2015/0361665 A1 * | 12/2015 | Banthia | .................. | E04C 5/073 106/638 |

* cited by examiner

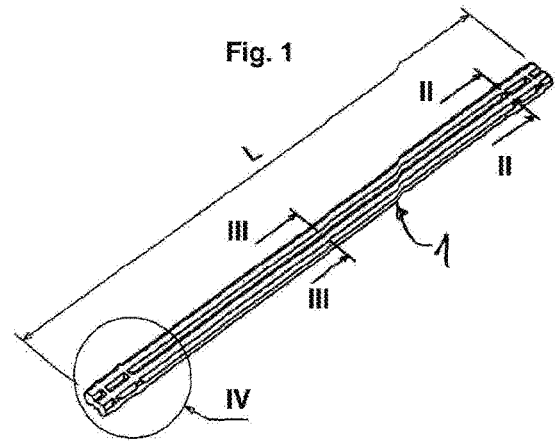
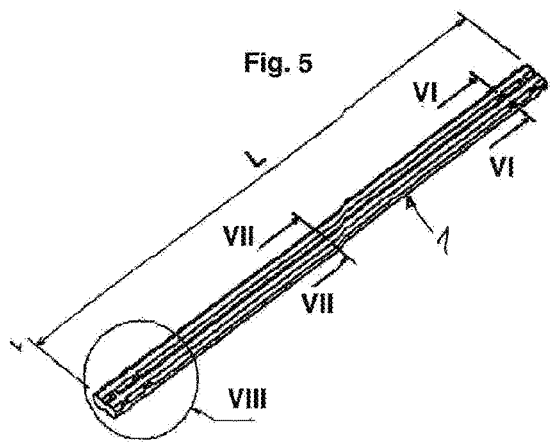
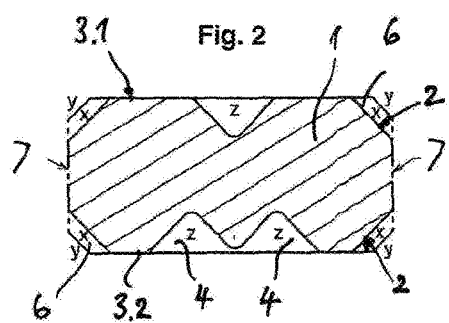
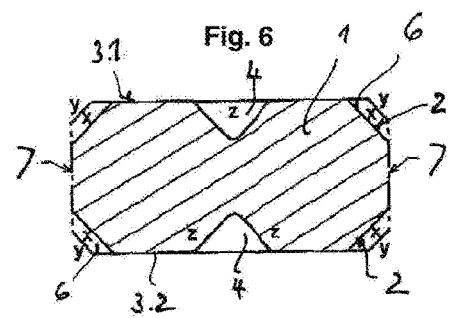
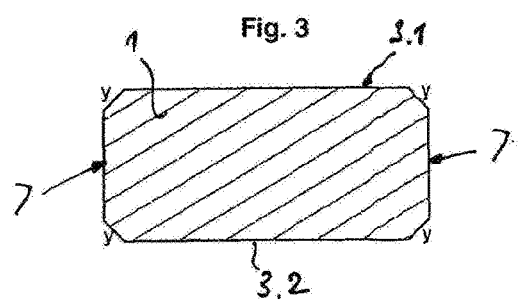
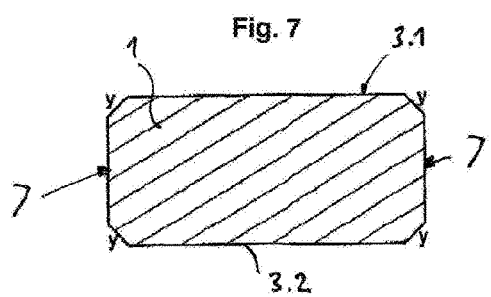
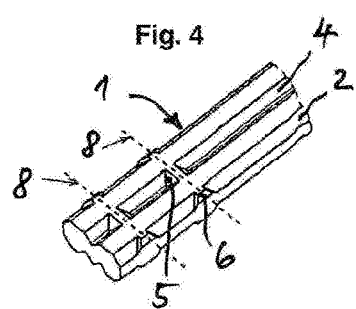
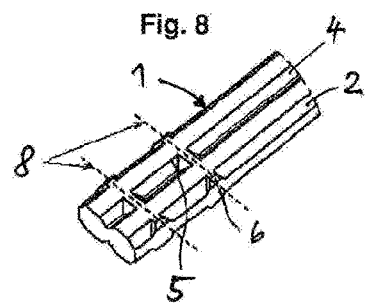

PROFILED METAL FIBER

CROSS REFERENCE TO RELATED APPLICATIONS

This application is the US-national stage of PCT application PCT/DE2017/000364 filed 2 Nov. 2017 and claiming the priority of German patent application 102016013615.4 itself filed 15 Nov. 2015 and German patent application 102017006298.6 itself filed 4 Jul. 2017. Replacement Drawing (1 sheets)

The invention relates to a profiled metal fiber having a substantially rectangular cross section, also with bent ends to form a clip for stabilizing, bonding, attaching, or joining materials and construction materials such as concrete, wood, paper and the like, particularly made of steel, in which narrow side faces of the fiber side faces extending in the fiber longitudinal direction are flanked by corner chamfers extending obliquely to the fiber side faces.

Such a metal fiber has become known, for example, from DE 10 2009 048 751 [U.S. Pat. No. 8,771,837]. By virtue of their substantially better characteristics in comparison to the prior art, they are ideal for a wide range of applications. However, due to the geometric dimensions that are usually employed, great demands are placed particularly on the tools used in manufacturing.

It is therefore the object of the present invention to further develop a metal fiber of the above-described type such that it continues to provide equally good or even improved practical characteristics while placing lesser demands on the mechanical equipment required during manufacturing.

This object is attained according to the invention in that the two wide side faces of the rectangular fiber are provided with longitudinally extending V-shaped grooves, with the chamfers being provided with projections and the V-shaped grooves with end zones at their longitudinal ends, and with the projections forming anchor heads and the end zones forming anchor surfaces with respect to the materials to be stabilized, bonded, or attached.

The advantage achieved by the invention is essentially that, initially due to the rectangular shape of the metal fibers, the conditions for notching, rolling, and subsequent longitudinal separation of the metal fiber cores are substantially improved, enabling lesser demands to be placed on the tools. When properly designed and positioned, the notches in the fibers facilitate guidance from top roller to the bottom roller because the occurrence of the axial forces acting on the guidance of the tools is reduced. Finally, the V-shaped grooves create an additional possibility for anchoring in that each of the end zones thereof forms anchor surfaces.

In particular, the rolling process is rendered much more uniform and reliable, and there are additional advantages in terms of tool design for the longitudinal separating unit and production stability. One consequence of this is short conversion times, longer tool life, and more uniform fiber quality.

In a preferred embodiment of the invention, one of the wide side faces has at least one V-shaped groove and the oppositely situated wide side face has at least two V-shaped grooves of the same size. This combination and arrangement of the grooves has proven to be especially advantageous in the context of the invention.

It is also favorable in this regard if each V-shaped groove is oriented centrally on the respective wide fiber side face.

In an alternative embodiment of the invention, however, there is also the equally advantageous possibility that the two wide side faces have respective V-shaped grooves that oppose one another and have the same size and are centrally disposed in the surface.

Accordingly, it is advantageous if the two V-shaped grooves on the oppositely situated wide fiber side faces are positioned symmetrically or centrally with respect to the wide fiber side face and are immediately adjacent one another in the middle or lie close to one another.

In another preferred embodiment of the invention, the depth of the V-shaped grooves is in the range from 25% to 40% of the metal fiber thickness.

Furthermore, it is advantageous if the anchor surfaces at the ends of the V-shaped grooves have a fixed size that is determined by the cross-sectional shape and depth of the V-shaped groove.

The width-to-height ratio of the metal fibers can vary within a relatively wide range; however, it has proven advantageous if the width dimension to the thickness dimension of the metal fiber is in the range from 4:1 and 1.5:1. In particular, a preferred aspect ratio has been found to be such that the width dimension to the thickness dimension of the metal fiber is about 2:1.

Moreover, within the scope of the invention the anchoring heads formed by the projections and the anchor surfaces formed by the end zones lie on a common anchor line that extends perpendicular to the longitudinal extent of the fiber.

Depending on the requirements being placed in terms of the desired characteristics, each fiber can have one or more anchor lines that are preferably arranged at the ends.

Moreover, the invention includes a method of manufacturing profiled metal fibers according to the features that are described in the foregoing and in detail in DE 10 2008 034 250 in which a sheet-metal strip for shaping the metal fibers is initially notched in a mutually opposing manner on both sides such that metal fiber cores are formed that are initially still interconnected by webs, the metal fiber strip undergoing a rolling process in order to subsequently convert the webs into thin, easily separable and, during separation, burr-free and split-faced interfaces, in which process each web is subjected to multiple flexural deformation about its longitudinal axis such that incipient cracks form in the vicinity of the webs as a result of fatigue fracturing, thus resulting in the separating web.

In these method steps, the invention is implemented such that, in order to form rectangular metal fibers, the distances between notches are greater than the thickness of the sheet-metal strip, and V-shaped grooves, each of which are bounded terminally, are rolled in with the notch onto the two wider outer faces formed in this way and support the axial guidance of upper and lower roller during the groove-rolling process, with the end boundaries of the grooves forming respective anchor surfaces of the metal fiber.

In the following, the invention will be explained in greater detail on the basis of an embodiment that is illustrated in the drawing, in which:

FIG. 1 is a perspective view of a single metal fiber,

FIG. 2 is a cross section along the line A-A of FIG. 1,

FIG. 3 is a cross section along an anchor line, namely the line B-B according to FIG. 1, FIG. 4 is a detail Z according to FIG. 1, and FIGS. 5 to 8 show an alternative embodiment in views corresponding to FIGS. 1 to 4.

The profiled metal fiber 1 shown in the drawing has a substantially rectangular cross section and is used for stabilizing, bonding, attaching, or joining materials and building materials such as concrete, wood, paper and the like. It is made particularly of steel and, depending on the application, can also be shaped in a manner not shown in further detail with bent ends to form a clip.

The narrow side faces of the fiber side faces are flanked by corner chamfers 2 that are aligned obliquely to the fiber side faces, as can be seen particularly in FIG. 2.

The two wide side faces 3.1, 3.2 are provided with longitudinally extending V-shaped grooves 4 having their longitudinal opposite end zones 5. Moreover, the chamfers 2 are provided with projections 6 forming anchoring heads and the end zones 5 of the V-shaped grooves 4 forming anchor surfaces that act on the materials to be stabilized, bonded, and/or attached. The projections 6, also denoted by x in FIG. 2, occur initially as a result of the notching process but can be altered with respect to their rolling surface by a scribing process (y). This can be regarded as a "fine adjustment" for the anchoring effect of the entire fiber. The anchor surfaces formed by the end zones 5 (denoted by z in FIG. 2), which are likewise formed by the notching process and whose size is determined by the notch depth, can no longer be changed after the notching process. They provide more uniform anchorage, since they are determined only by the notching tool, which is manufactured with the utmost precision.

As can be seen from FIG. 2, one of the wide side faces 3.1 has at least one V-shaped groove 4, while the fiber side face 3.2 situated opposite thereto has at least two V-shaped grooves 4 of the same size. Here, each V-shaped groove 4 is oriented centrally on the respective wide fiber side face 3.

The two V-shaped grooves 4 on the oppositely situated wide fiber side face 3.2 are positioned symmetrically and/or centrally with respect to the wide fiber side face 3.2 and are immediately adjacent one another in the middle or can also be close to one another. The depth of the V-shaped grooves 4 is usually selected so as to be in the range from 25% to 40% of the metal fiber thickness.

In an alternative embodiment of the invention, as shown particularly in FIGS. 5 to 8, there is also the equally advantageous possibility that the two wide side faces 3.1, 3.2 have respective V-shaped grooves 4 that oppose one another and have the same size and are centrally positioned in the surface.

The anchor surfaces formed by the end zones 5 terminally bounding the V-shaped grooves 4 have a fixed size that is determined by the cross-sectional shape and depth of the V-shaped groove 4, as can be seen particularly in FIG. 4.

The ratio of the width dimension to the thickness dimension of the metal fiber 1 is advantageously in the range between 4:1 and 1.5:1; in particular, a ratio in which the width dimension and thickness dimension of the metal fiber 1 is about 2:1 has proven advantageous.

As can be seen from FIG. 4 in particular, the anchoring heads formed by the projections 6 and the anchor surfaces formed by the end zones 5 lie on a common anchor line 8 that extends perpendicular to the longitudinal direction of the fiber.

Each metal fiber can have one or more anchor lines 8, preferably arranged at the ends.

To manufacture these metal fibers 1, a method is recommended in particular in which a metal strip for forming the metal fibers 1 is first notched on both sides in opposing fashion, thus forming metal fiber cores. At first, these are additionally interconnected by webs. In order to subsequently reshape the webs into thin, easily separable separating webs that form burr-free and split-faced interfaces 7 when separated, the metal fiber web undergoes a rolling process in which each web is subjected to multiple flexural deformation about its longitudinal axis. As a result, incipient cracks form in the webs due to fatigue fracturing, thereby creating a separating web. In order to form rectangular metal fibers 1, the notches are then selected so as to be larger than the thickness of the sheet-metal strip. V-shaped grooves 4 are rolled in with the notch onto the two wider outer faces formed in this way and are each terminally bounded. These grooves 4 assist in the rolling process, the axial guidance of upper and lower roller, the end boundaries of the grooves 4 forming the later anchor surfaces of the metal fiber.

The invention claimed is:

1. A profiled metal fiber having:
a polygonal cross section with bent ends to form a clip for stabilizing, bonding, attaching, or joining materials and construction materials and made of steel,
two mutually parallel narrow side faces extending in a fiber longitudinal direction;
two mutually parallel wide longitudinally extending side faces wider than the narrow faces, one of the wide side faces being formed with two respective longitudinally extending and transversely spaced V-shaped grooves that are flank and are symmetrically offset from a center of the one wide side and the other of the wide faces being formed with a single V-shaped groove oriented centrally of the other wide face, and
four corner chamfer faces each extending obliquely between a respective one of the narrow side faces and a respective one of the wide side faces, the chamfer faces being formed with projections and the V-shaped grooves with end zones at their longitudinal ends, the projections forming anchor heads and the end zones forming anchor surfaces with respect to the materials to be stabilized, bonded, or attached, a ratio of a width dimension perpendicular to the narrow side faces to a thickness dimension perpendicular to the wide side faces of the metal fiber is at least 1.5:1.

2. The metal fiber according to claim 1, wherein the two V-shaped grooves on the wide side face are positioned symmetrically or centrally with respect to the other wide side face and are immediately adjacent one another in the middle or lie close to one another.

3. The metal fiber according to claim 1, wherein a depth of the V-shaped grooves is in the range from 25-40% of a thickness of the metal fiber.

4. The metal fiber according to claim 1, wherein the anchor surfaces terminally bounding the V-shaped grooves have a fixed size that is determined by a cross-sectional shape and depth of the V-shaped grooves.

5. The metal fiber according to claim 1, wherein a ratio of a width dimension perpendicular to the narrow side faces to a thickness dimension perpendicular to the wide side faces of the metal fiber is in the range from 4:1 to 1.5:1.

6. The metal fiber according to claim 5, wherein the ratio of is about 2:1.

7. The metal fiber according to claim 1, wherein the anchoring heads formed by the projections and the anchor surfaces formed by the end zones lie on a common anchor line that extends perpendicular to the longitudinal direction of the fiber.

8. The metal fiber according to claim 7, wherein each fiber has at longitudinal ends one or more anchor lines.

9. The metal fiber according to claim 1, wherein one of the wide side faces has only one of the V-shaped grooves and the other wide side face has one or two of the V-shaped grooves of the same size as the groove of the one wide side face.

* * * * *